2,880,250

SYNTHESIS OF 3-PHENYL-3-METHYL HEXANE

Seymour Meyerson, Gary, Ind., and Paul N. Rylander, Chicago, Ill., assignors to Standard Oil Company, Chicago, Ill., a corporation of Indiana No Drawing. Application September 7, 1956
Serial No. 608,422

4 Claims. (Cl. 260—671)

This invention relates to the synthesis of 3-aryl-3-methylhexane by the reaction of a halo paraffin and benzene or toluene.

It has been discovered that benzene and toluene, in the presence of ferric chloride catalyst, and at a temperature between about 0° C. and about 30° C., are alkylated by 3-halo-3-ethylpentane to substantially exclusively 3-aryl-3-methylhexane. One of the carbon atoms in the ethyl side chain shifts to lengthen the straight chain and to produce a structure having 6 carbon atoms in the longest straight chain with a methyl branch instead of starting structure of 5 carbon atoms in the longest straight chain and an ethyl branch.

The halo paraffin is a haloethylpentane with either chlorine, bromine, or iodine as the halogen atom and the ethyl branch, both joined to the No. 3 carbon atom in the straight chain according to the Geneva nomenclature. Thus the halo paraffin may be 3-chloro-3-ethylpentane, 3-bromo-3-ethylpentane, or 3-iodo-3-ethylpentane.

In order to avoid side reactions which decrease the yield of the desired product, the alkylation reaction is carried out using substantially pure aromatic hydrocarbon and substantially pure halo paraffin.

The alkylation catalyst consists essentially of ferric chloride. Essentially anhydrous solid ferric chloride which has been ground to fine particles is preferred. At least a sufficient amount of ferric chloride is present in the alkylation zone to catalyze the reaction. It is preferred to use between about 0.01 and 0.5 mole of ferric chloride per mole of defined halo paraffin present in the alkylation zone.

Temperature is important in the production of the 3-aryl-3-methylhexane alkylate as substantially the only hydrocarbon reaction product. The reaction is carried out at a temperature between about 0° C. and about 30° C. and preferably between about 5° and 15° C. It is to be understood that the pressure maintained on the alkylation zone is such that both the aromatic hydrocarbon and the defined halo paraffin are maintained in the liquid state.

By control of the temperature and the use of the defined amounts of ferric chloride catalyst, an alkylate is produced which contains in excess of 90 mole percent of 3-aryl-3-methylhexane. In the case of benzene reactant, the product is substantially pure 3-phenyl-3-methylhexane. In the case of toluene reactant, the product is substantially 3(p-tolyl)-3-methylhexane. Operation at the lower temperatures produces an alkylate which is even more nearly the pure single isomer.

The method of the instant invention is described in connection with the following working illustration.

EXAMPLE

In this example, 0.1 mole of 3-chloro-3-ethylpentane was dissolved in 1.0 mole of benzene. The benzene was nitration grade and the chloroethylpentane was essentially pure as determined by mass spectrometry. The solution was cooled to 5° C. and 0.06 mole of finely divided solid anhydrous ferric chloride added thereto. The solution was allowed to warm slowly to room temperature at about 25° while being agitated by a propeller stirrer. The conclusion of the alkylation reaction was determined with the cessation of the evolution of hydrogen chloride gas. Water was added to the flask containing the materials and the hydrocarbon layer then decanted from the aqueous layer. The hydrocarbon layer was washed successively with 10% hydrochloric acid solution, 5% aqueous sodium bicarbonate solution and distilled water. The washed hydrocarbons were then dried over calcium chloride. The hydrocarbon mixture was fractionated in a spinning band column into close boiling cuts. The close boiling cuts were then analyzed with a commercial mass spectrometer.

A cut boiling at 110° C. at 20 mm. Hg pressure with an $n_D^{20}$ of 1.4950 corresponded to 3-phenyl-3-methylhexane of about 95% purity. The contaminant is tentatively identified as 2-phenyl-2,3-dimethylpentane.

Test 1

In this test, 2-chloro-2-methylpentane was used to alkylate benzene under the conditions as given in the example above. Close-boiling fraction boiling at 89.5° C. at 20 mm. Hg, having an $n_D^{20}$ of 1.4930 was identified by mass spectrometry as about 98% pure 2-phenyl-2-methylpentane. The contaminants were tentatively identified as 3-phenyl-3-methylpentane and 2-phenylhexane. Thus when using the methyl branched halo pentane, there was no change in the number of carbon atoms in the longest straight chain as occurred when using the ethyl branched halo pentane of the above example.

Test 2

The above example was repeated except that solid aluminum chloride was used as the catalyst. Insofar as could be determined, the alkylate contained essentially no 3-phenyl-3-methylhexane or the conventionally expected product 3-phenyl-3-ethylpentane. Tentatively the chief product of the aluminum chloride catalyst reaction was a mixture of products having the empirical formulas $C_{13}H_{16}$, $C_{13}H_{18}$ and $C_{13}H_{20}$.

The product of the method of this invention is particularly useful in the preparation of synthetic detergents wherein a tailor-made detergent is desirable. The presence of only a single specific alkyl substituent on the benzene ring greatly simplifies the problem of adjusting detergent characteristics. A further use of the method of the product of the invention lies in the preparation of essentially pure 3-methylhexane by the removal of the aryl substituent through conventional dealkylation procedure.

Thus having described the invention, what is claimed is:

1. A method of preparing substantially pure 3-aryl-3-methylhexane which method comprises alkylating an aromatic hydrocarbon from the class consisting of benzene and toluene with 3-halo-3-ethylpentane, said halogen atom being selected from the class consisting of chlorine, bromine and iodine, in the presence of ferric chloride catalyst and at a temperature between about 0° C. and about 30° C. and separating 3-aryl-3-methylhexane, as substantially the only alkylation product, from the reaction mixture.

2. The method of claim 1 wherein said hydrocarbon is benzene.

3. The method of claim 1 wherein said hydrocarbon is toluene.

4. A method of preparing substantially pure 3-phenyl-3-methylhexane which comprises reacting benzene and 3-chloro-3-ethylpentane, in a mole ratio of benzene to said pentane of between about 1 and 30, at a temperature between about 0° C. and 30° C., in the presence of ferric chloride catalyst, in an amount between about 0.01 and 0.5 mole per mole of said pentane, and separating, as substantially the only alkylate, 3-phenyl-3-methylhexane from the catalyst-hydrocarbon mixture.

References Cited in the file of this patent

UNITED STATES PATENTS 2,759,028    Schmerling _____ Aug. 14, 1956

OTHER REFERENCES

Huston et al.: Jour. of Org. Chem., vol. 3, 1938, pp. 251–260; Chem. Abst., vol. 33, 1939, p. 972.

Huston et al.: Jour. Amer. Chem. Soc., vol. 64, July 1942, p 1576.

Huston et al.: Jour. of Org. Chem., vol. 15, 1950, pp. 1074–1081; Chem. Abst., vol. 45, 1951, p. 2851.